Oct. 29, 1963   W. A. WILLIAMS   3,108,483
VARIABLE PITCH SHEAVES HAVING A LARGE NUMBER OF GROOVES
Filed March 7, 1961   3 Sheets-Sheet 1
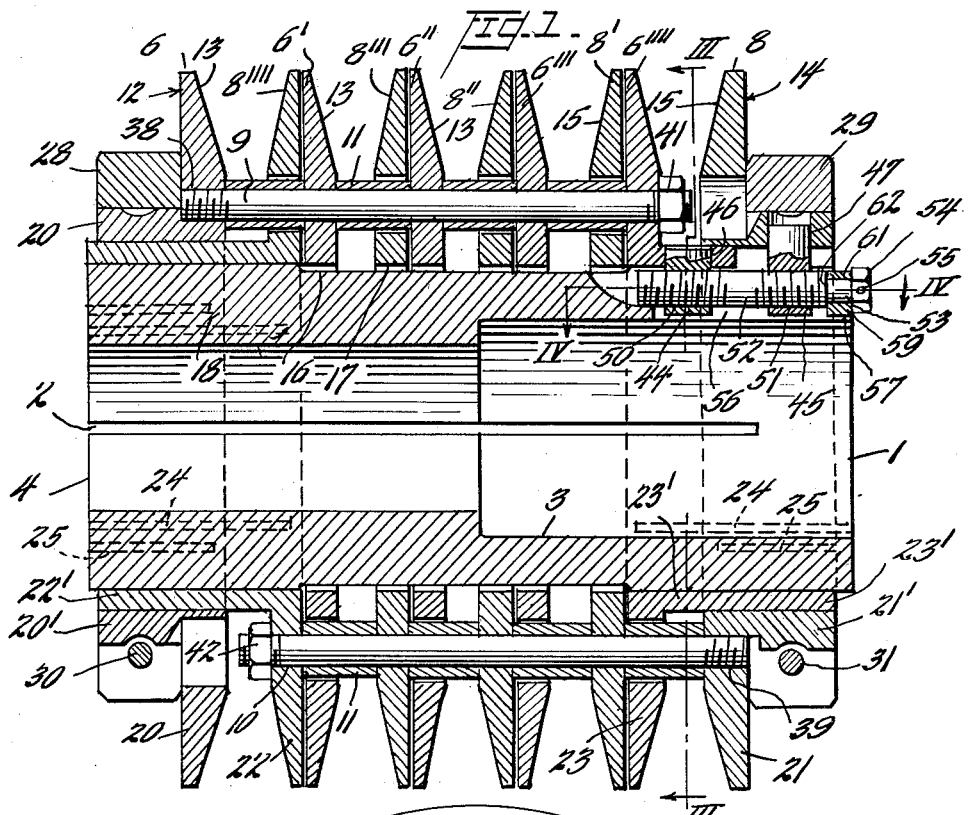
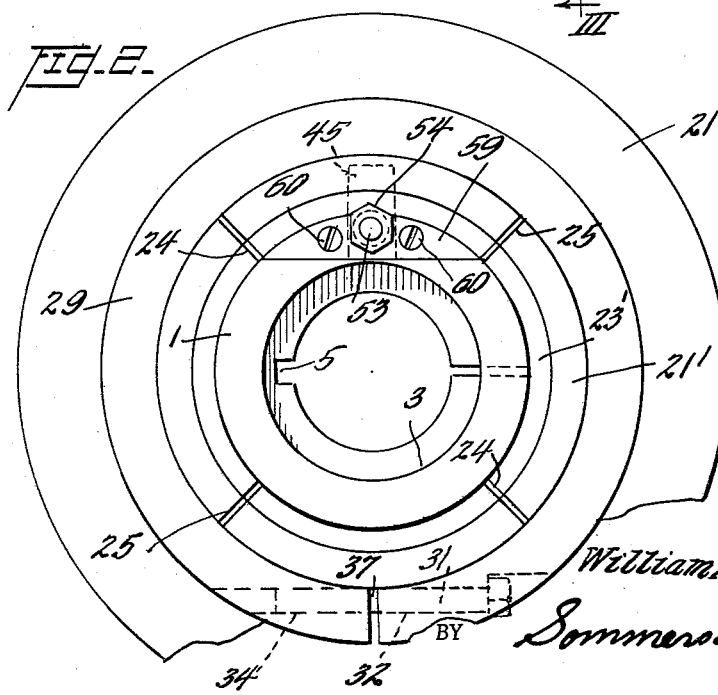
INVENTOR
William A. Williams,
BY Sommers & Young
ATTORNEYS

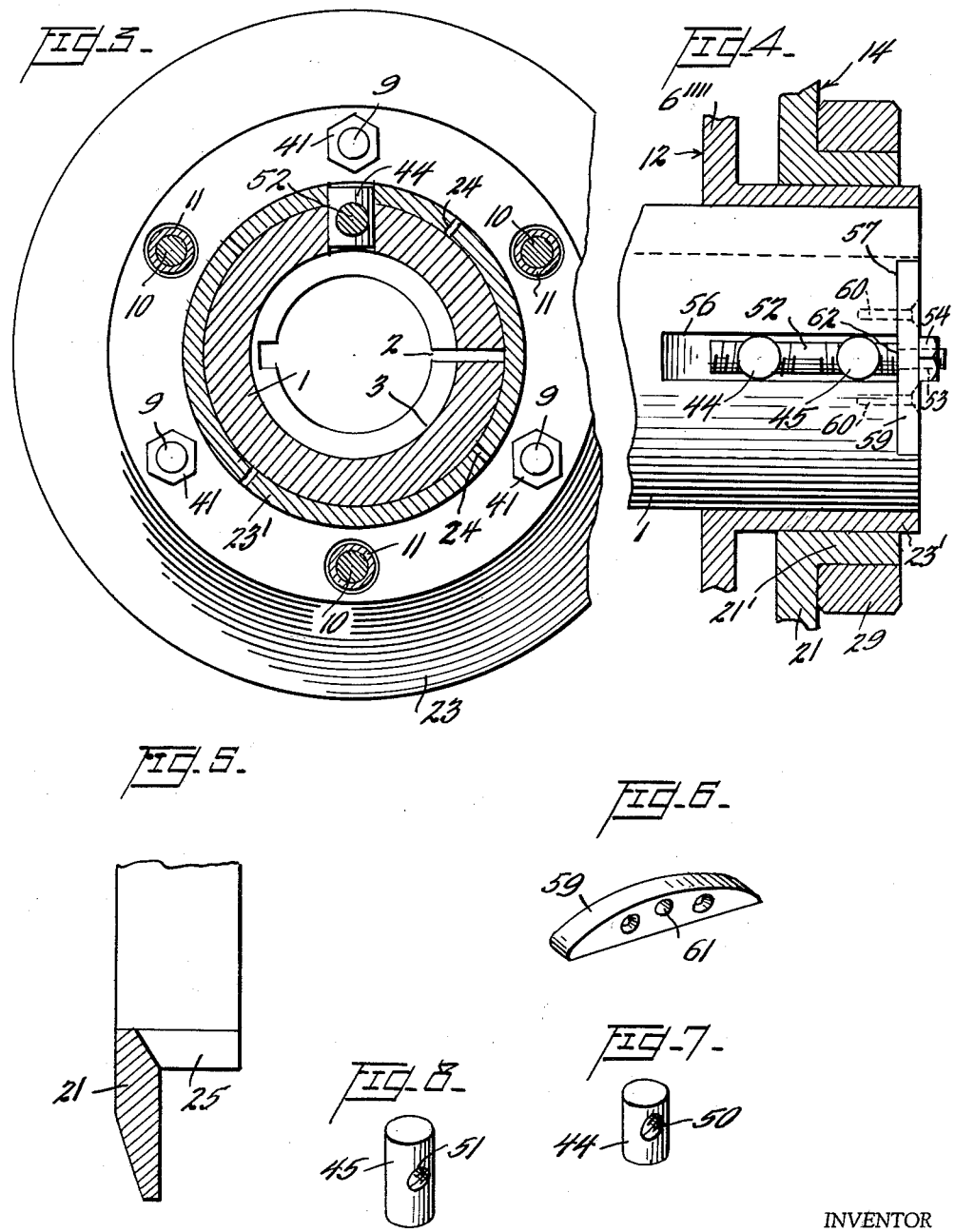

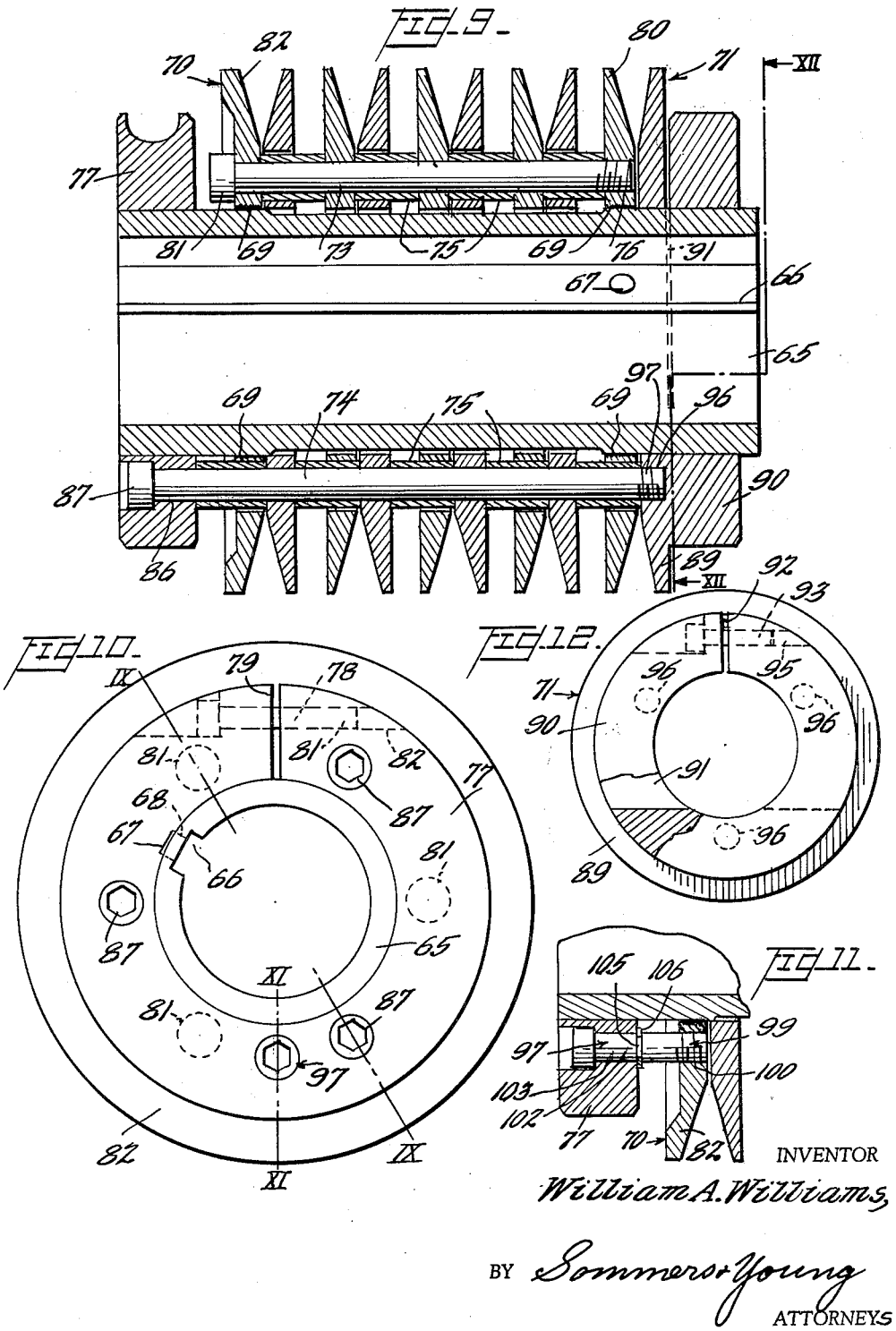

United States Patent Office

3,108,483
Patented Oct. 29, 1963

3,108,483
VARIABLE PITCH SHEAVES HAVING A LARGE
NUMBER OF GROOVES
William A. Williams, Philadelphia, Pa., assignor to T. B.
Wood's Sons Company, a corporation of Pennsylvania
Filed Mar. 7, 1961, Ser. No. 94,046
15 Claims. (Cl. 74—230.17)

This invention relates to multi-grooved variable pitch sheaves and particularly to sheaves having comparatively large numbers of flanges and grooves.

In the past it was known that in variable pitch sheaves having axially adjustable flanges provided with conical faces oppositely arranged in adjacent pairs facing each other, when the number of grooves was comparatively large, say more than four, it was desirable to provide means for locking all of the flanges directly onto a central sleeve serving as the hub of the sheave. Otherwise, in such sheaves, with only the end flanges locked, the inner flanges tended to move radially against the hub in operation causing wear and freezing on the hub.

In applicant's Patent No. 2,610,515 a construction is shown in which all of the flanges individually are locked on the hub sleeve due to the expansion of the hub sleeve. This construction tends to be impractical because it is complicated and expensive. To work satisfactorily the bores of the flanges must be very accurately maintained or they will not all lock up, and then fretting can occur.

An object of the present invention is to provide a construction for multi-grooved variable pitch sheaves in which the drawbacks mentioned above are eliminated.

Another object of the invention is to provide a construction of the type hereinabove mentioned, in which at least some of the interior flanges are maintained free and clear of the hub sleeve, and are held against lateral and axial displacement by especially securely fixed locking means located toward or at the ends of the sheave.

A further object of this invention is to provide a novel construction of end locking means for providing especially secure locking of the flanges toward the ends of the sheave.

A further object of this invention is to provide a construction in which the interior flanges of the sheave are sustained by the locking means, located at or toward the ends of the sheave, against radial movement into contact with the hub sleeve as well as against axial movement.

A further object of this invention is to provide a construction having the advantages set forth in the foregoing statement of objects while retaining the advantages of expeditious assembly of the system of flanges of the sheave.

Other objects of the invention will become apparent from the following detail description and representation of the invention in the drawings in which FIGURE 1 is a vertical sectional view of an assembly of a sheave according to a first embodiment of the invention;

FIGURE 2 is an end view of the embodiment of FIG. 1 looking toward the left;

FIGURE 3 is a vertical sectional view of the sheave assembly on the section line III—III of FIG. 1;

FIGURE 4 is a section approximately on the line IV—IV of FIG. 1, the hub being shown in elevation, illustrating details;

FIGURE 5 is a sectional view of a portion of the right hand end flange illustrating its axially extending inner flange as being axially split from its free end;

FIGURE 6 is a perspective view of a cross key serving as part of the adjusting mechanism;

FIGURES 7 and 8 are perspective views of cylindrical nuts serving as parts of the adjusting means;

FIGURE 9 is a vertical sectional view of an assembly of a sheave according to a modified embodiment of the invention;

FIGURE 10 is an end view of FIG. 9 from the left;

FIGURE 11 is an axial sectional view in line XI—XI of FIG. 10, illustrating certain details of the flange adjusting means;

FIGURE 12 is sectional view on a reduced scale on section line XII—XII of FIG. 9, illustrating details of one of the clamping collars.

In the embodiment of the invention represented by FIGS. 1–8, reference numeral 1 designates a sleeve which serves as the hub of the sheave, and upon which the other elements, such as the conical flanges, are mounted. Sleeve 1 is provided with a split 2 extending longitudinally from one end 4 for a substantial part of the length of the sleeve. This split is of appreciable width and serves to permit the sleeve to be contracted for mounting on a shaft (not shown) for operation. The inner diameter of the sleeve 1 at the end portion 3 opposite that from which split 2 extends is greater than the diameter of the other portion thereof. Approximately opposite the split 2 the inner face of the sleeve 1 is provided with a longitudinally extending kerf 5, which increases the flexibility of the sleeve to facilitate mounting of the sleeve on a shaft by contraction. As shown this kerf extends the entire length of the portion of the sleeve having the smaller internal diameter.

On the outside of sleeve 1 are mounted the elements of the sheave by which the V-shaped grooves are formed. As represented in the embodiment illustrated by FIGS. 1 to 8, there are two sets of flanges 6, 6', 6'', 6''' and 6'''', and 8, 8', 8'', 8''' and 8'''', each set being illustrated as comprising five flanges, each set being held together in a rigid group by bolts 9 and 10, respectively, and pipe spacers 11 which extend through openings in the flanges of the other set respectively. One of the sets 12 has conical surfaces 13 toward their radially outward portions facing to the left as viewed in FIG. 1, and the other set 14 has conical surfaces 15 facing oppositely, and since the flanges of the two sets are arranged alternately, the two sets form five pairs of groove-forming elements.

One of the principal purposes of the present invention is to mount and lock the flanges in such a way that most of the inner flanges of each set are carried by some of the flanges of the corresponding set located toward the ends and to this end the central portion of the outside of sleeve 1 is provided with a slightly reduced diameter 16 providing clearance 17 between the sleeve and the inner edges of all of the flanges of each set except the two toward each end of the sheave, even though the inner diameters of the flanges located along the reduced portion 18 are equal to the full outside diameter of the sleeve. In case the inside diameter of the inner flanges is made slightly larger than the full outside diameter of the sleeve the groove can be omitted but in such case the operation of assembling of the sheave is somewhat complicated for reasons which will be explained later.

In order to lock the flanges on the sleeve with sufficient firmness to resist the forces which develop in operation, the first end flange 20 and 21 at each end of the sheave is provided with an axially extending flange each extending in the direction of the respectively adjacent end of the sleeve, and the inside diameter of said first flanges and of their axial extensions is larger than the outside diameter of the sleeve. Each of the second-from-the-end flanges 22 and 23 respectively, is provided with an axially extending flange 22' and 23' respectively at its inner edge extending toward the respectively adjacent end of the sleeve and of a thickness and size as to pass through and fill the opening inside the respectively adjacent first flanges 20 and 21. The axially extending flanges of both the said first and second-from-the-end flanges are at both ends of the sheave provided with one or more splits 24 and 25 from their free ends of sufficient width to permit contraction by locking collars 28 and 29 respectively, having cross-bolts 30, 31 which extend, respectively, through openings 32 and thread into screw threaded bores 34 on the opposite sides of gaps 37 therein.

The bolts 9 and 10 which hold the flanges in sets may be screw-threaded on both ends, and one end of each is threaded into a screw threaded bore 38, 39, in the opposite end flanges, respectively. The other ends are provided with nuts 41, 42 which engage against the axially outer faces of the respective second-from-end flanges. The two first flanges are each provided with openings which freely accommodate the nuts and bolt ends depending on the condition of adjustment of the variable pitch sheave.

The mechanism for effecting adjustment of the flanges for altering the pitch of the sheave is comprised of a pair of cylindrical nuts 44, 45. Nut 44 is lodged in radial, cylindrical bore 46, in the axial flange 23' of the right hand first flange 6'''' of flange set 12 and the other in a similar bore 47 of the axial flange 21' of right hand first flange 21 of flange set 14. The nuts 44 and 45 are disposed in axially spaced relationship, and have bores 50, 51, respectively, extending transversely of the nuts, and, thus, axially of the sheave in operative position, and the bores of the said nuts are provided with threads of oposite hand in their bores. Through these bores an adjusting screw 52 extends having on its corresponding portions threads matching those of the nuts. The outer end portion of screw 52 is of reduced diameter forming a shank 23 and a head 54 is attached thereto by a rollpin 55 extending laterally through the same and through a transverse bore in the shank of the adjusting screw. To accommodate the nuts 44 and 45 and the adjusting screw the adjacent end portion of sleeve 1 is appropriately recessed as indicated at 56.

At its extreme right hand end sleeve 1 is also provided with a transversely extending recess 57 at its outer edge, in which recess is seated a cross key 59 which is secured to the sleeve by screws 60. This cross key is provided with an opening 61, through which extends the shank 53 of adjusting screw 52. In assembled relation the cross key 59 is situated between the shoulder 62 at the inner end of shank 53 and head 54. Cross key 59 serves to anchor adjusting screw 52 against axial movement.

To effect adjustment of the pitch of the sheave the locking collars 28 and 29 are loosened and screw head 54 is turned. Since the nut 44 is connected with one set of flanges and nut 45 with the other set, the two sets of flanges will move relative to each other, until, in the extreme position of adjustment opposite to that shown, the nut 41 of bolt 9 will be located in opening 41' of the right hand end flange 8 and nut 42 of bolt 10 will be located in opening 42' of left hand flange 6.

When the desired position of adjustment is obtained, the locking collars 28 and 29 are tightened by operating cross bolts 30 and 31 whereupon the said collars squeeze and contract the axial flanges 20', 22', and 21', 23' upon the sleeve and the split portion of the sleeve 1 upon the shaft upon which it is to be mounted, for example, the shaft of an electric motor.

Due to the fact that each of the locking collars 28 and 29 bears on two flange sleeves as well as on the hub sleeve, a firmer grip and more secure locking of the sheave is attained, and, therefore, a greater number of flanges and resulting grooves can be used than would be possible with a sheave in which only the axial flanges of the end flanges were squeezed against the sleeve.

The above described embodiment has the advantage that the centers of operation of the grooves are not altered by adjustment of the pitch.

In the embodiment of the invention represented by FIGS. 9–11 the same advantages are attained in a different way. In this embodiment the hub of the sheave is also comprised by a sleeve bearing reference character 65. This sleeve is of the type that is secured on its operating shaft by means of a key (not shown) which would be accommodated in keyway 66 and a corresponding keyway in the operating shaft, and the key would be secured in position by set screw 67 in radial screw threaded bore 68 in said sleeve.

The flanges which form the grooves for the V-belts are conical and are arranged in two sets 70 and 71. The flanges of one of these sets 70 are connected together by bolts 73 and 74 and are spaced apart from each other by pipe spacers 75. The bolts 73 are screwed into screw-threaded bore 76 in one end flange 80 of flange set 70 and the heads 81 of said bolts engaged against the outer face of the other end flange 82 of flange set 70. The conicals faces of the flanges of the two sets face toward each other thus forming the V-shaped grooves.

The end flanges 80 and 82 of flange set 70 are mounted on parts of sleeve 65 having the full diameter of said sleeve and are fixedly secured on said sleeve by a chemical bond 69 with a high-surface-tension liquid binding agent which flows readily into the small clearance between the said flanges and the sleeve, and hardens by virtue of the catalytic action set up by the confined space between the metals of the flanges and sleeve. The flanges of flange set 70 are therefore fixed against axial motion.

Between the locations of the two end flanges of flange set 70 the sleeve 65 is slightly recessed or grooved, that is to say, its diameter is slightly reduced, so as to prevent contact between the inner peripheries of the intermediately located flanges of flange set 70 and the sleeve. This avoids fretting and wear and possible freezing between said intermediate flanges and the sleeve.

The other set of flanges 71 has its individual flanges arranged alternately of the flanges of flange set 70 and this set 71 is connected together rigidly by bolts 74 and spaced apart by pipe spacers 75. Since the first set of flanges 70 is integrally connected with sleeve 65, in order for adjustment of the pitch of the sheave to be possible, the flange set 71 must be axially movable. For this purpose, at one end, for instance, the left hand end as viewed in FIG. 9 a split collar 77 is provided having a cross bolt 78 extending across the split 79, and having a head engaging a shoulder 80 on one side of the split, and its opposite, screw-threaded end portion engaging with screw threads 81 in a bore 82 on the other side of the split. This collar is provided with axial bores 86 through which bolts 74 extend and serves as abutment means against which the bolt heads 87 engage.

At the other end, that is, the right hand end, of flange set 71 the end flange 89 is provided with a hub-like extension 90 which is separated from flange 89 throughout a considerable part of its angular extent by a gap 91 and the hub-like extension is provided with a split 92. The hub-like extension has a cross bolt 93 extending across split 92 and has its head engaging the extension on one side of the split and has its threaded end engaged screw threaded bore 95, on the other side of split 92. In operation this split hub-like extension 90 therefore serves the purpose of a locking collar.

The right hand end flange 89 of flange set 71 is provided with angularly spaced, axially extending screw-threaded bores 96 into which the screw threaded end portions 97 of bolts 74 are screwed to hold flange set 71 rigidly together as a unit. These screw-threaded bores 96 do not extend across gap 91 into the hub-like portion 90.

When the cross bolts 78 and 93 are loosened the flange set unit can be adjusted axially to change the pitch of the sheave. For this purpose an adjustment screw 97 (see FIGURE 11) is provided having a threaded end portion 99 engaged in a screw-threaded bore 100 in the first flange at the left flange 82 of flange set 70. This screw also has a non-threaded portion 102 which extends through a plane bore 103 in collar 79, and the head of the screw is located in a recess of the collar 79. Screw 97 is provided with a slight annularly extending recess 105 just inwardly of the axially inner face of collar 79 and in this recess a retaining ring or clip 106 is lodged so as to extend outwardly and abut the said inner face of collar 79. When cap screw 97 is turned in one direction retaining ring 106 presses against collar 79 and flange set 71 is drawn to the left increasing the operating diameter of the sheave, whereas, when the screw is turned in the other direction its head presses against collar 79 and moves flange set 71 to the right reducing its operating diameter.

When the sheave is adjusted to the desired pitch cross bolts 77 and 93 are tightened and locking collars 79 and 90 are squeezed upon sleeve 65 and since these collars are rigidly connected together and to all the flanges of flange set 71 they both exert their joint and combined locking effect upon the entire flange set 71. This double locking is sufficient to hold satisfactorily a sheave having a comparatively large number of grooves, that is to say, more than four grooves.

Similarly as in the first embodiment, sleeve 65 may be provided with a reduced diameter at its center portion inside the intermediately located flanges of the sets of flanges.

The advantage of forming the middle portion of the sleeves with slightly reduced diameter instead of providing slightly larger inner diameters in the intermediate flanges is that in assembling the sheaves the flanges can be threaded onto a dummy sleeve of a diameter equal to the full diameter of the sleeve on which they will be mounted for operation, and the task of inserting the various bolts and pipe spacers through their corresponding openings in the flanges is greatly simplified. If the sleeves are made of uniform diameter and the intermediate flanges with larger inner diameters the danger of the flanges bearing against the sleeve with consequent fretting wear and possible freezing can be avoided, but the work involved in assembling of the elements is more complicated and time consuming.

I claim:

1. In a multi-grooved, adjustable pitch sheave, a sleeve, a plurality of sheave flanges on said sleeve, said flanges having conical surfaces toward their outer edges, said flanges being arranged with said conical flanges alternatively facing in opposite axial directions forming V-shaped grooves between the adjacent pairs thereof, means fixedly connecting the alternate ones of said flanges into sets, pitch adjusting means for moving one of said sets axially relative to the other set, releasable means at each end fixedly securing said one of said sets of flanges on said sleeve, the connecting means of said sets of flanges supporting the intermediate flanges of said sets, respectively, against both axial and radial movement in operation and means fixing said other set on said sleeve.

2. A multi-grooved, adjustable pitch sheave according to claim 1, and in which said connecting means of both of said sets of flanges support the intermediate flanges of said sets out of contact with said sleeve to prevent wear and freezing of said intermediate flanges on said sleeve.

3. A multi-grooved, adjustable pitch sheave according to claim 1, and in which said releasable securing means of said one set of flanges comprises at least two locking collars.

4. A multi-grooved, adjustable pitch sheave according to claim 3, and in which the connecting means of the other of said sets of flanges supports the intermediately positioned flanges of said other set from the end flanges of said set against both axial movement, and against radial movement, with the inner edges of said intermediate flanges out of contact with said sleeve to prevent contact, wear, and freezing of said intermediately positioned flanges of said other set on said sleeve.

5. A multi-grooved, adjustable pitch sheave according to claim 4, and in which said sleeve at its intermediate portion, between the end flanges of said one set of flanges, is of reduced diameter to provide clearance between the intermediate flanges of said sets and said sleeve.

6. A multi-grooved, adjustable pitch sheave according to claim 3, and in which said locking collars are comprised of split rings having an abutment on one side of the split and a screw-threaded bore on the other side thereof, and screw-threaded bolts extending across the splits of said rings engaging said abutments with their heads and in the screw-threaded bores with their threads respectively.

7. A multi-grooved, adjustable pitch sheave according to claim 3, and in which said pitch adjusting means comprises an axially extending screw rotatably engaging one of said locking collars, abutment means securing said adjusting means against axial movement relative to said engaged collar, means rigidly connecting one of said sets of flanges with said collar, said adjusting bolt having screw threads engaging the other set of said sets of flanges to effect relative axial movement between said sets of flanges when said engaged collar is released from locked position.

8. A multi-grooved, adjustable pitch sheave according to claim 7, and in which the means securing said adjusting screw with respect to said collar comprises a head on said screw engaging said collar on one side and an abutment secured in a recess in said screw engaging said collar on the other side thereof.

9. A multi-grooved, adjustable pitch sheave according to claim 3, and in which one of said locking collars is integral with the adjacent end flange and comprises an axially extending flange thereof, said axially extending flange being separated from said end flange by a gap extending a substantial part of but not all of the angular extent of said flanges, said axial flange being split and having a cross-bolt extending across said split for squeezing said axially extending flange for locking on said sleeve.

10. A multi-grooved, adjustable pitch sheave according to claim 9, and in which the other locking collar is located at the opposite end of said sets of flanges, and the connecting means of the set of flanges which includes the flange having the integral locking collar, comprises a bolt rigidly connecting said flange having the integral collar with the locking collar at the other end of said sets of flanges, whereby in operation the locking effect of both of said locking collars is exerted on the set of flanges in which the flange with the integral collar is included.

11. A multi-grooved, adjustable pitch sheave according to claim 1, and in which the means connecting the alternate flanges together in sets comprise bolts extending between the end flanges of the respective sets.

12. A multi-grooved, adjustable pitch sheave according to claim 11, and in which pipe spacers are mounted on said bolts between the respective flanges of said sets to maintain spacing therebetween.

13. A multi-grooved, adjustable pitch sheave according to claim 1, and in which said means fixing said other set on said sleeve is adhesive means.

14. A multi-grooved, adjustable pitch sheave according to claim 1, and in which the means fixing the other set of flanges on said sleeve is an integral bond.

15. A multi-grooved, adjustable pitch sheave according to claim 1, and in which fixing means of said other of said sets is a chemical bond between the metals of one of the flanges of said other set and said sleeve.

References Cited in the file of this patent

UNITED STATES PATENTS

| | | |
|---|---|---|
| 2,151,987 | Perrine et al. | Mar. 28, 1939 |
| 2,254,045 | Nylin | Aug. 26, 1941 |
| 2,447,958 | Mueller et al. | Aug. 24, 1948 |
| 2,503,462 | Wyzenbeek | Apr. 11, 1950 |
| 2,545,327 | Williams | Mar. 13, 1951 |
| 2,548,387 | May | Apr. 10, 1951 |
| 2,907,597 | Williams | Oct. 6, 1959 |

FOREIGN PATENTS

| | | |
|---|---|---|
| 462,039 | Great Britain | 1937 |
| 855,650 | Germany | July 8, 1949 |
| 666,398 | Great Britain | Feb. 13, 1952 |